A. P. SMITH.
BATTERY CHANGER.
APPLICATION FILED APR. 17, 1916.

1,249,223.

Patented Dec. 4, 1917.
4 SHEETS—SHEET 1.

Witnesses
Frederick L. Fox
Wm P. Smith

Inventor
Arthur P. Smith
By Victor J. Evans
Attorney

A. P. SMITH.
BATTERY CHANGER.
APPLICATION FILED APR. 17, 1916.

1,249,223.

Patented Dec. 4, 1917.
4 SHEETS—SHEET 2.

Witnesses
Frederick L. Fox,
Wm. R. Smith

Inventor
Arthur P. Smith.

By Victor J. Evans.
Attorney

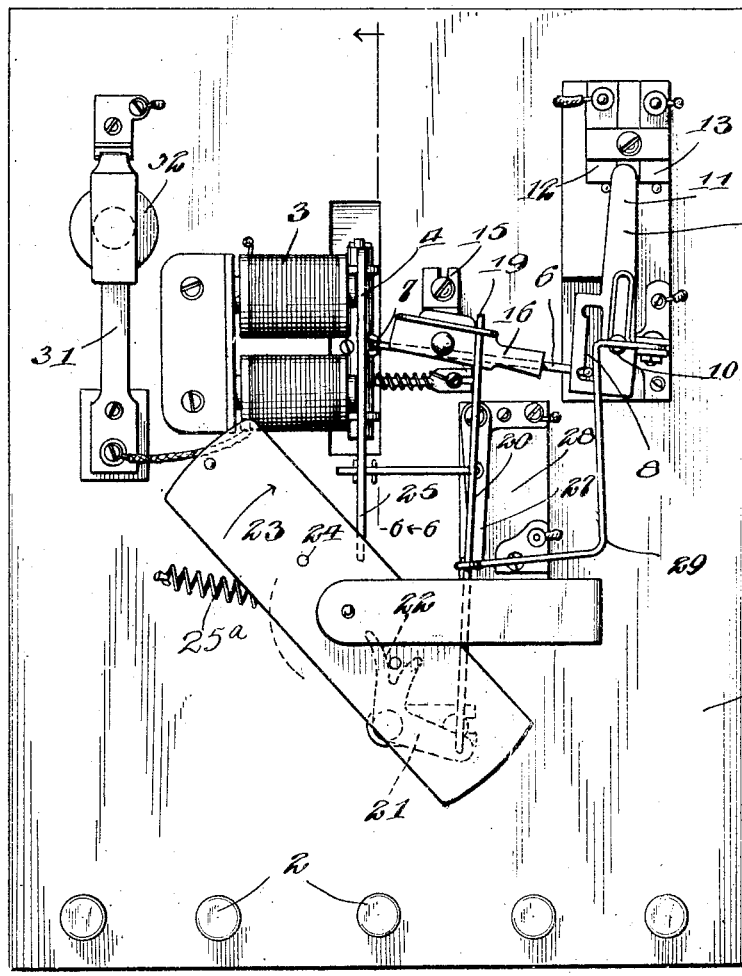

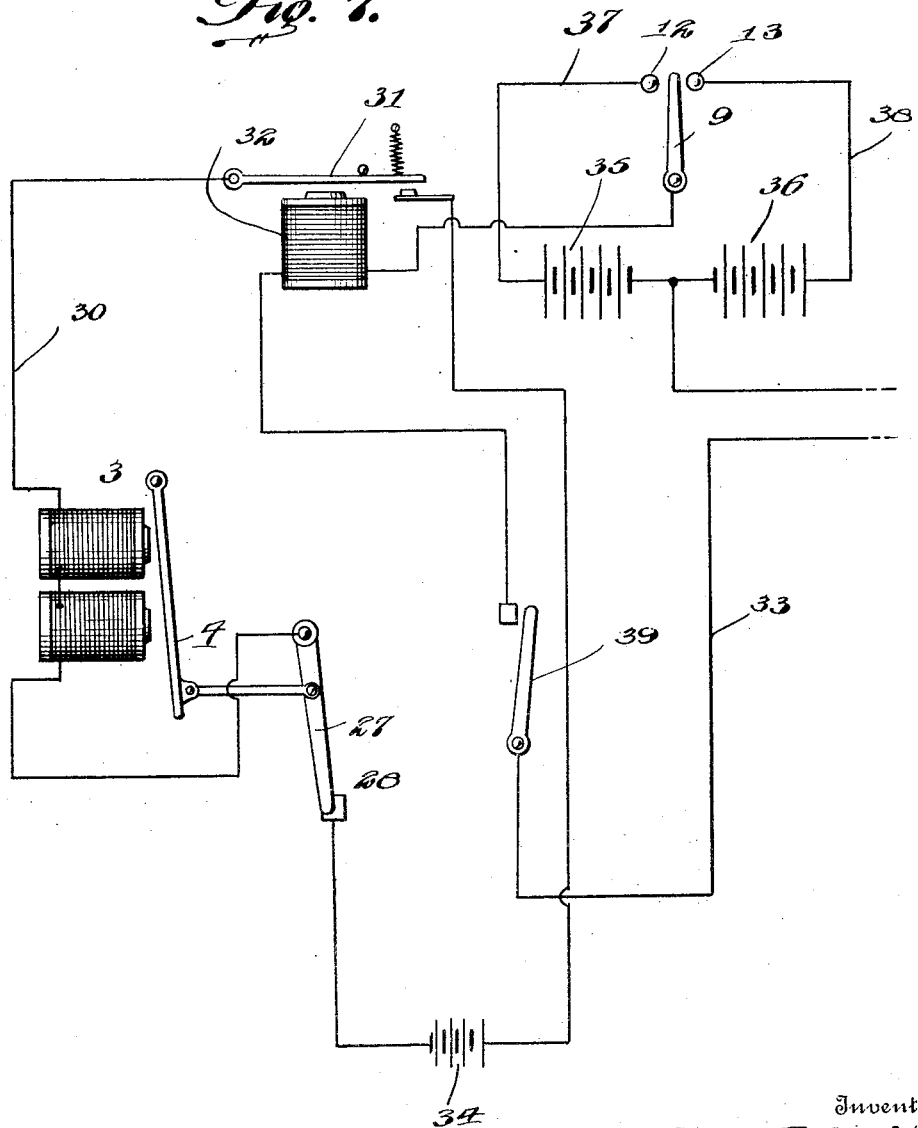

UNITED STATES PATENT OFFICE.

ARTHUR P. SMITH, OF PORTLAND, MAINE, ASSIGNOR OF ONE-THIRD TO HENRY J. LESSARD, OF PORTLAND, MAINE.

BATTERY-CHANGER.

1,249,223.   Specification of Letters Patent.   Patented Dec. 4, 1917.

Application filed April 17, 1916. Serial No. 91,697.

*To all whom it may concern:*

Be it known that I, ARTHUR P. SMITH, a citizen of the United States, residing at Portland, in the county of Cumberland and State of Maine, have invented new and useful Improvements in Battery-Changers, of which the following is a specification.

This invention relates to an apparatus for intermittently inserting sets of batteries into a circuit with the resultant increase of the life of the batteries.

The primary object of the invention is to provide an apparatus capable of inserting into and removing successfully a plurality of sets of batteries from a circuit, at such a speed that the current flow in the circuit will be substantially continuous relative to a current consuming device.

An object of the invention is to so associate the elements that a single magnet will be capable of actuating all of the elements and at such rapidity that excessive sparking at the switches will be eliminated.

Besides the above, my invention is to distinguish in the use of two armatures of different rapidity of action, actuated by a single magnet, one of which the quick acting armature initially moving through the medium of a rod, a switch, and the other, the slow acting armature, subsequently moving the rod to a position to reverse the movement of the switch upon another energization of the magnet.

The invention will be better understood from the following detailed description taken in connection with the accompanying drawings wherein a preferred embodiment is illustrated, and the features of novelty including all the above mentioned and various others will be hereinafter pointed out in the appended claims.

In the drawings:

Figs. 2 and 3 are similar views showing the elements in other positions.

Fig. 6 is a sectional view.

Fig. 7 is a diagrammatic view of the wiring.

Figures 1, 4:
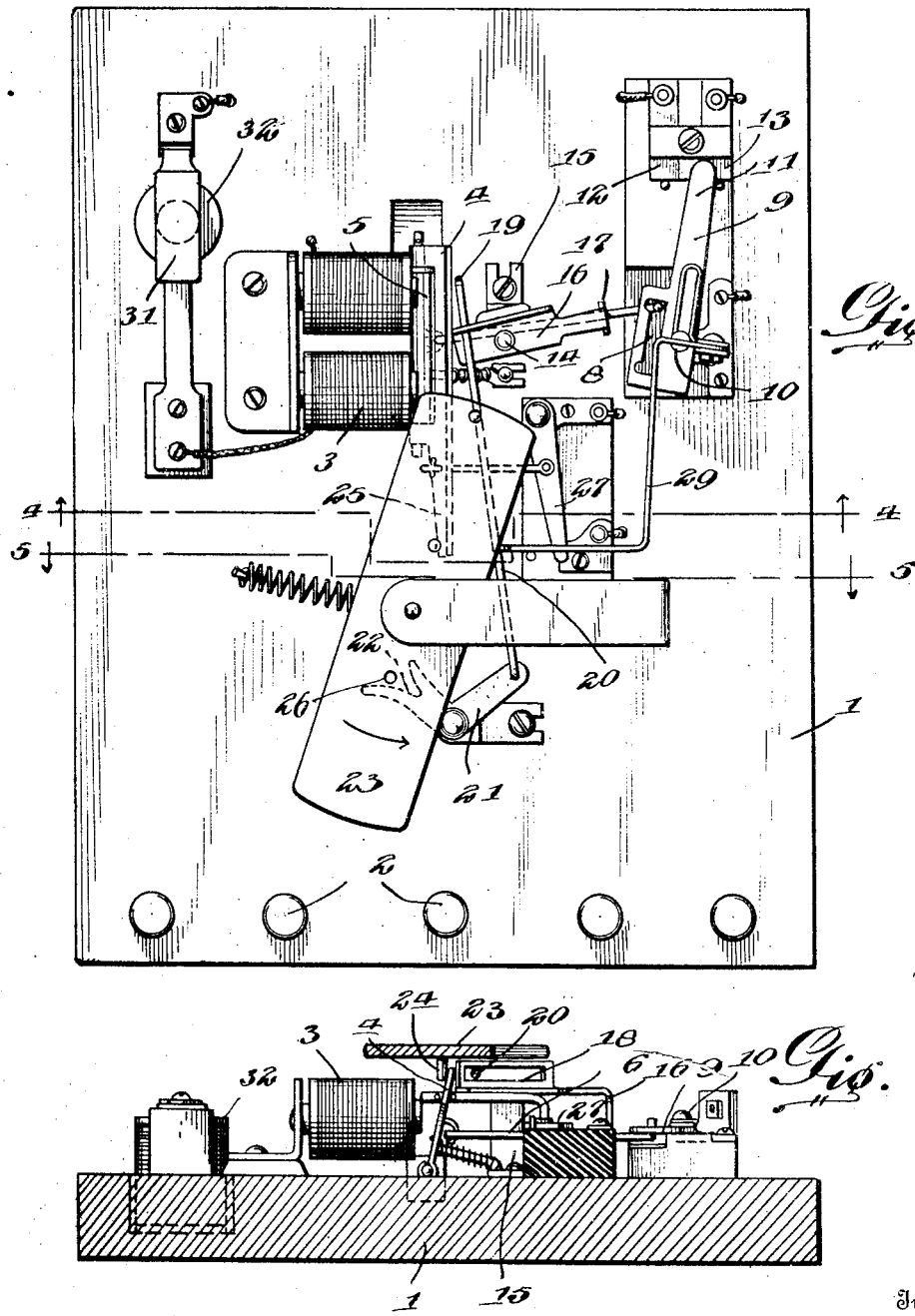
Figure 1 is a top plan view of the apparatus with the elements in one position.
Fig. 4 is a sectional view on the line 4—4 of Fig. 1.
Figure 2:
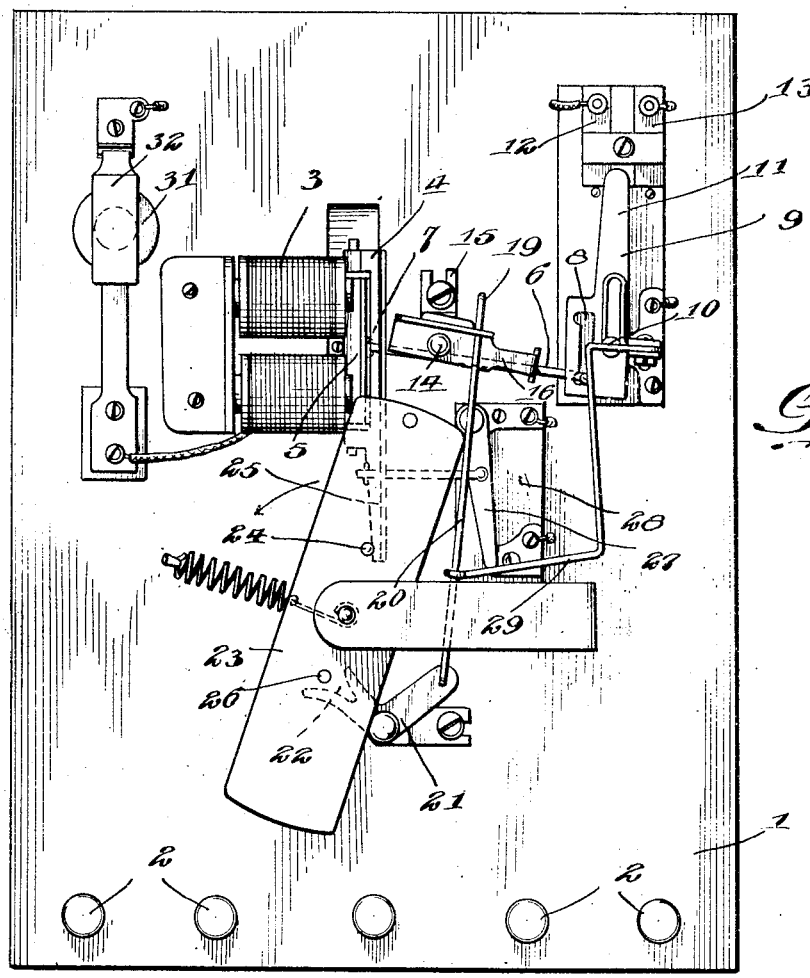
Figure 5:
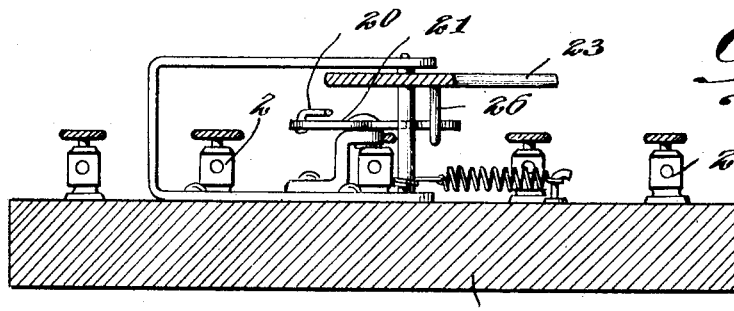
Fig. 5 is a sectional view on the line 5—5 of Fig. 1.

Referring to the drawings I have shown the mechanism mounted upon a suitable form or base 1 that carries a plurality of binding posts 2 by means of which the different elements may be electrically connected to the circuits to be described later. A magnet 3 is mounted upon the base and controls two armatures 4 and 5 of different size and weight, the rapidity of the latter, the lightest, being greater than the former.

A rod 6 has one extremity bent at right angles and pivotally connected to the armature 5 as indicated at 7, while the remaining extremity is bent at right angles and lodged in a slot 8 formed in a switch arm 9 which controls the insertion and withdrawal of the sets of batteries in a circuit. This switch arm 9 is mounted for swinging movement by means of the pivot 10 which lies in a position intermediate the ends of the slot 8. The active end 11 of the switch arm coöperates with a pair of spaced contacts 12 and 13.

Pivotally supported by a pin 14 carried by a bracket 15 mounted upon the base 1 is a plate 16. This plate 16 has a forked extremity 17 straddling an intermediate portion of the rod 6 with the result that when the plate is swung about the pin 14 the forked extremity will cause the rod 6 to change its position in the slot 8.

For giving swinging movements to the plate 16 for accomplishing the foregoing result I provide a slot 18 in the plate in which is loosely mounted the right-angularly bent extremity 19 of the rod 20. The remaining end of the rod 20 is pivotally mounted in one arm of the bell-crank lever 21, the remaining arm of which being bifurcated as illustrated at 22.

For giving two movements to the rod 20 upon one energization of the magnet 3, I provide an oscillatory member or weight 23, the oscillations of which being accomplished by the coöperation between a pin 24 depending from the member 23 and an extension 25 on the armature 4 and a spring 25$^a$. The member 23 carries another pin 26 coöperating with the bifurcation 22. The extension 25 besides controlling the actuation of the member 23, controls the movement of the movable element 27 of a switch 28. An intermediate portion of the rod 20 is encircled by the looped extremity of a link 29 that has its remaining extremity rigidly secured to the arm 9 in close proximity to the pivot 10.

Referring more particularly to Fig. 7 of the drawings, it will be seen that the magnet 3 is arranged in a circuit 30, the continuity of which being controlled by means of an electric circuit breaker 31, the magnet 32 of which being arranged in the main circuit 33. A battery 34 is arranged in the circuit 30 while two independent sets of batteries 35 and 36 are arranged to be alternately inserted into the main circuit 33 by movement of the switch arm 9 into engagement with the contacts 12 and 13 which form respectively a terminal for conductors 37 and 38 leading from the positive poles of the batteries. The switch arm 9 is electrically connected to one of the conductors of the main circuit while the remaining conductor is electrically connected to the negative poles of the batteries 35 and 36.

In the operation of the apparatus the switch 39 is manually closed with the result that current will flow through the main circuit 33 depending upon which contact 12 and 13 engages the arm 9. Upon energization of the magnet 32 the circuit breaker is moved to closed position with the result that current from the battery 34 energizes the magnet 3 which instantly moves the armature 5 and slightly later the armature 4. Upon movement of the armature 5 the rod 6 will be given a rectilinear motion with the result that the arm 9 is thrown about its pivot for engaging the other contact, thus throwing into the main circuit the other battery. Subsequently to this action the armature 4 moves to a position to give an impulse to the member 23 and interrupt the circuit 30 at the switch 28 upon rotary motion of the member 23. The bellcrank lever 21 is actuated which in turn actuates the rod 20, the latter in turn moving the plate 16 about the pin 14 with the result that the rod 6 changes its position in the slot 8.

At this point, I wish to call attention to the fact that as the arm 9 is moved about its pivot by means of the rod 6, the link 29 slides the rod 20 in the slot 18 to a new position relative to the pin 14.

From the foregoing description, it will be seen that upon one energization of the magnet 3, I am able to give two movements to the rod 20 so that the rod 6 may be properly disposed for moving the arm 9 in opposite direction.

What I claim is:

1. A battery changer comprising an electromagnet, a circuit therefor, a plurality of sources of current, a main circuit, a pivoted switch arm for connecting said sources of current successively to said main circuit, an armature under the control of said magnet and connected to said switch arm and means for moving the point of connection between said arm and armature to opposite sides of the pivot of the arm.

2. A battery changer comprising an electromagnet, a circuit therefor, a plurality of sources of current, a main circuit, a pivoted switch arm arranging the sources of current in said main circuit and having a longitudinal slot extending to opposite sides of the pivot, an armature under the control of the magnet, a connector between said slot and armature, and means for moving said connector to opposite ends of the slot.

3. A battery changer comprising an electromagnet, a circuit therefor, a plurality of sources of current, a main circuit, a pivoted switch arm arranging the sources of current in said main circuit and having a longitudinal slot extending to opposite sides of the pivot, an armature under the control of the magnet, a connector between said slot and armature, and means including a second armature under the control of said magnet for moving said connector to opposite ends of the slot.

4. A battery changer comprising an electromagnet, a circuit therefor, a plurality of sources of current, a main circuit, a pivoted switch arm arranging the sources of current in said main circuit and having a longitudinal slot extending to opposite sides of the pivot, an armature under the control of the magnet, a connector between said slot and armature, and means operated upon movement of said second armature for breaking the magnet circuit.

5. A battery changer comprising an electromagnet, a circuit therefor, a plurality of sources of current, a main circuit, a pivoted switch arm for connecting the sources of current to the main circuit, having a longitudinal slot extending to opposite sides of the pivot, a quick acting armature under the control of the magnet, a connector between said slot and armature, and means including a slow acting armature under the control of said magnet for moving said connector to opposite ends of said slot.

6. A battery changer comprising an electromagnet, a circuit therefor, a plurality of sources of current, a main circuit, a pivoted switch arm for connecting the sources of current to the main circuit, having a longitudinal slot extending to opposite sides of the pivot, a quick acting armature under the control of the magnet, a rod having one end pivoted to said armature with its remaining end arranged in said slot and means including a slow acting armature for giving sliding movement to said rod in said slot.

7. A battery changer comprising an electromagnet, a circuit therefor, a plurality of sources of current, a main circuit, a pivoted switch arm for connecting the sources of current to the main circuit, having a longitudinal slot extending to opposite sides of the pivot, a quick acting armature under the control of the magnet, a rod having one end pivoted to said armature with its remaining end arranged in said slot, and means for giving sliding movement to said rod in said slot subsequently to said armature being actuated.

8. A battery changer comprising an electromagnet, a circuit therefor, a plurality of sources of current, a main circuit, a pivoted switch arm for connecting the sources of current to the main circuit, having a longitudinal slot extending to opposite sides of the pivot, an armature under the control of the magnet, a rod having one end pivotally connected to said armature, its remaining end arranged in said slot, a pivoted plate having a forked extremity engaged in said rod, and means for swinging said plate.

9. A battery changer comprising an electromagnet, a circuit therefor, a plurality of sources of current, a main circuit, a pivoted switch arm for connecting the sources of current to the main circuit, having a longitudinal slot extending to opposite sides of the pivot, an armature under the control of the magnet, a rod having one end pivoted to said armature and its remaining end arranged in said slot, a pivoted slotted plate having a forked extremity engaging said rod, and means having a portion arranged in said slot for swinging said plate in opposite directions.

10. A battery changer comprising an electromagnet, a circuit therefor, a plurality of sources of current, a main circuit, a pivoted switch arm for connecting the sources of current to the main circuit, having a longitudinal slot extending to opposite sides of the pivot, an armature under the control of the magnet, a rod having one end pivoted to said armature and its remaining end arranged in said slot, a pivoted plate having a forked extremity engaging said rod and having a slot extending to opposite sides of the pivot of the plate, and means coöperating with said slot in said plate, and including an oscillatory weight for swinging said plate in opposite directions.

11. A battery changer comprising an electromagnet, a circuit therefor, a plurality of sources of current, a main circuit, a pivoted switch arm having a longitudinal slot extending to opposite sides of the pivot, an armature under the control of the magnet, a rod having one end pivoted to said armature and its remaining end arranged in said slot, a pivoted plate having a forked extremity engaging said rod and having a slot extending to opposite sides of the pivot of the plate, a second rod having one end portion arranged in the plate slot and oscillatory means actuated by said magnet for giving movement to said second rod in one direction, and means for giving movement to said second rod in another direction.

12. A battery changer comprising an electromagnet, a circuit therefor, a plurality of sources of current, a main circuit, a pivoted switch arm having a longitudinal slot extending to opposite sides of the pivot, an armature under the control of the magnet, a rod having one end pivoted to said armature and its remaining end arranged in said slot, a pivoted plate having a forked extremity engaging said rod and having a slot extending to opposite sides of the pivot of the plate, a second rod having one end portion arranged in the plate slot, and oscillatory means actuated by said magnet for giving movement to said second rod in one direction, and means actuated by said switch arm for giving movement to said second rod in another direction.

13. A battery changer comprising an electromagnet, a circuit therefor, a plurality of sources of current, a main circuit, a pivoted switch arm having a longitudinal slot extending to opposite sides of the pivot, an armature under the control of the magnet, a rod having one end pivoted to said armature and its remaining end arranged in said slot, a pivoted plate having a forked extremity engaging said rod and having a slot extending to opposite sides of the pivot of the plate, a second rod having one end portion arranged in the plate slot, oscillatory means actuated by said magnet for giving movement to said second rod in one direction, and a link connecting an intermediate portion of said second rod to said switch arm.

14. A battery changer comprising an electromagnet, a circuit therefor, a plurality of sources of current, a main circuit, a pivoted switch arm adapted to successively connect said sources of current to said main circuit, means actuated by said magnet for moving said switch arm in opposite directions, a slidably mounted rod for controlling the actuation of said means, and means under the control of said switch arm and said magnet for giving movement to said rod.

15. A battery changer comprising an electromagnet, a circuit therefor, a plurality of sources of current, a main circuit, a pivoted switch for successively connecting said sources of current to the main circuit, an armature under the control of said magnet, a pin and slot connection between said armature and switch arm, a pivoted plate for moving the pin and slot connection to opposite sides of the pivot of the switch, a slidably mounted rod for giving movement to said plate, an oscillatory element for giving movement to said rod, a second armature under the control of said magnet for actuating said element, and means supported by the switch arm for changing the connection between said rod and plate whereby said plate may be moved in opposite directions.

In testimony whereof I affix my signature in presence of two witnesses.

ARTHUR P. SMITH.

Witnesses:
C. R. KNOWLES,
FREDERICK SMALL.

Copies of this patent may be obtained for five cents each, by addressing the "Commissioner of Patents, Washington, D. C."